United States Patent
Yeh

(10) Patent No.: US 6,717,574 B2
(45) Date of Patent: Apr. 6, 2004

(54) FEEDBACK PEAK DETECTOR FITTED WIRELESS HANDWRITING TABLET

(75) Inventor: Chia-Jui Yeh, Hsinchu (TW)

(73) Assignee: Aiptek International Inc., Hsinchu (TW)

( * ) Notice: Subject to any disclaimer, the term of this patent is extended or adjusted under 35 U.S.C. 154(b) by 389 days.

(21) Appl. No.: 09/885,331

(22) Filed: Jun. 19, 2001

(65) Prior Publication Data

US 2002/0189869 A1 Dec. 19, 2002

(51) Int. Cl.[7] .................................................. G09G 5/00
(52) U.S. Cl. ..................... 345/173; 345/179; 178/18.01
(58) Field of Search ........................ 345/173, 174, 345/175, 176, 177, 178, 179, 182, 183; 178/18.01, 18.1, 19.01, 20.01, 20.02, 20.03, 20.04

(56) References Cited

U.S. PATENT DOCUMENTS

| | | | | | |
|---|---|---|---|---|---|
| 4,281,323 | A | * | 7/1981 | Burnett et al. | 345/174 |
| 5,528,002 | A | * | 6/1996 | Katabami | 178/19.06 |
| 5,528,267 | A | * | 6/1996 | Ise | 345/174 |
| 5,905,489 | A | * | 5/1999 | Takahama et al. | 345/174 |
| 6,180,894 | B1 | * | 1/2001 | Chao et al. | 178/18.03 |
| 6,243,652 | B1 | * | 6/2001 | Fawcett et al. | 702/65 |
| 6,310,611 | B1 | * | 10/2001 | Caldwell | 345/173 |

* cited by examiner

Primary Examiner—Xiao Wu

(57) ABSTRACT

In a feedback peak detector fitted wireless handwriting tablet, the feedback peak detector comprises a feedback comparator buffer unit, a peak detection switch unit, a fast charge path unit, a peak signal holding unit, and a fast discharge unit. The feedback peak detector is designed with a light load capable of stabilizing peak signals and fast charging/discharging a capacitor to ensure the correct calculation of coordinates for keeping handwriting at a normal and stable speed.

9 Claims, 5 Drawing Sheets

US 6,717,574 B2

FEEDBACK PEAK DETECTOR FITTED WIRELESS HANDWRITING TABLET

FIELD OF THE INVENTION

This invention relates to a feedback peak detector fitted wireless handwriting tablet that stands at the key position in analog-digital conversion for enhancing correctness of analog signals by peak sampling and holding to facilitate detection of absolute coordinates of a wireless stylus on a handwriting tablet.

BACKGROUND OF THE INVENTION

Referring to FIG. 1—a circuit block diagram of a conventional wireless handwriting tablet—a plurality of antennas is distributed in array equidistantly in X-axis and Y-axis direction on both faces of a detector 1 for receiving electromagnetic waves emitted by a wireless stylus 2. A microprocessor 3 is provided to scan all the antennas one after another sequentially and analyze intensity of the signal received to find out to which antenna the stylus 2 is adjacent, then compare the gradients and slopes of the signals of the immediate neighboring antennas to calculate and obtain the absolute coordinates of the wireless stylus 2.

A peak detector 5 plays a key role in the hardware design of the wireless handwriting tablet for receiving analog voltage signals 40 come from a precedent OP amp 4 and sending out peak signals 50 to an Analog/Digital Converter (ADC) 6. Hence, errors may be incurred in A/D conversion and coordinates accordingly in the case of a defective peak detector.

The circuitry of a conventional peak detector may be classified in two categories: one is shown in FIG. 2 and the other in FIG. 3, which are described below.

The one shown in FIG. 2 is defective in a small capacitor C1, which is liable to be charged to an undesirable peak by an instantaneous surge or noise, however, if the capacitor C1 is enlarged improperly, the charging speed will be slowed down to result in amplification deficiency and waveform distortion. The other shown in FIG. 3 is defective that when a MOSFET Q2 is biased by a control pulse signal 30 and turned on or off, a surge is generated to apply upon a capacitor C2, which then holds voltage at a level quite different from that of the precedent circuits to therefore incur jittering and erroneous calculation of the absolute coordinates of the stylus. Besides, a problem of charge/discharge speed is introduced in such a circuit.

SUMMARY OF THE INVENTION

The primary object of this invention is to provide a feedback peak detector fitted wireless handwriting tablet, wherein the peak detector is capable of stabilizing peak signals and performing fast charge/discharge to make a stable and correct coordinate calculation and maintain a normal handwriting speed of a wireless tablet.

In order to realize abovesaid object, the peak detector of this invention is composed of: a feedback comparator buffer unit, a peak detection switch unit, a fast charge path unit, a peak signal holding unit, and a fast discharge unit.

For more detailed information regarding advantages or features of this invention, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE INVENTION

Figure 1:
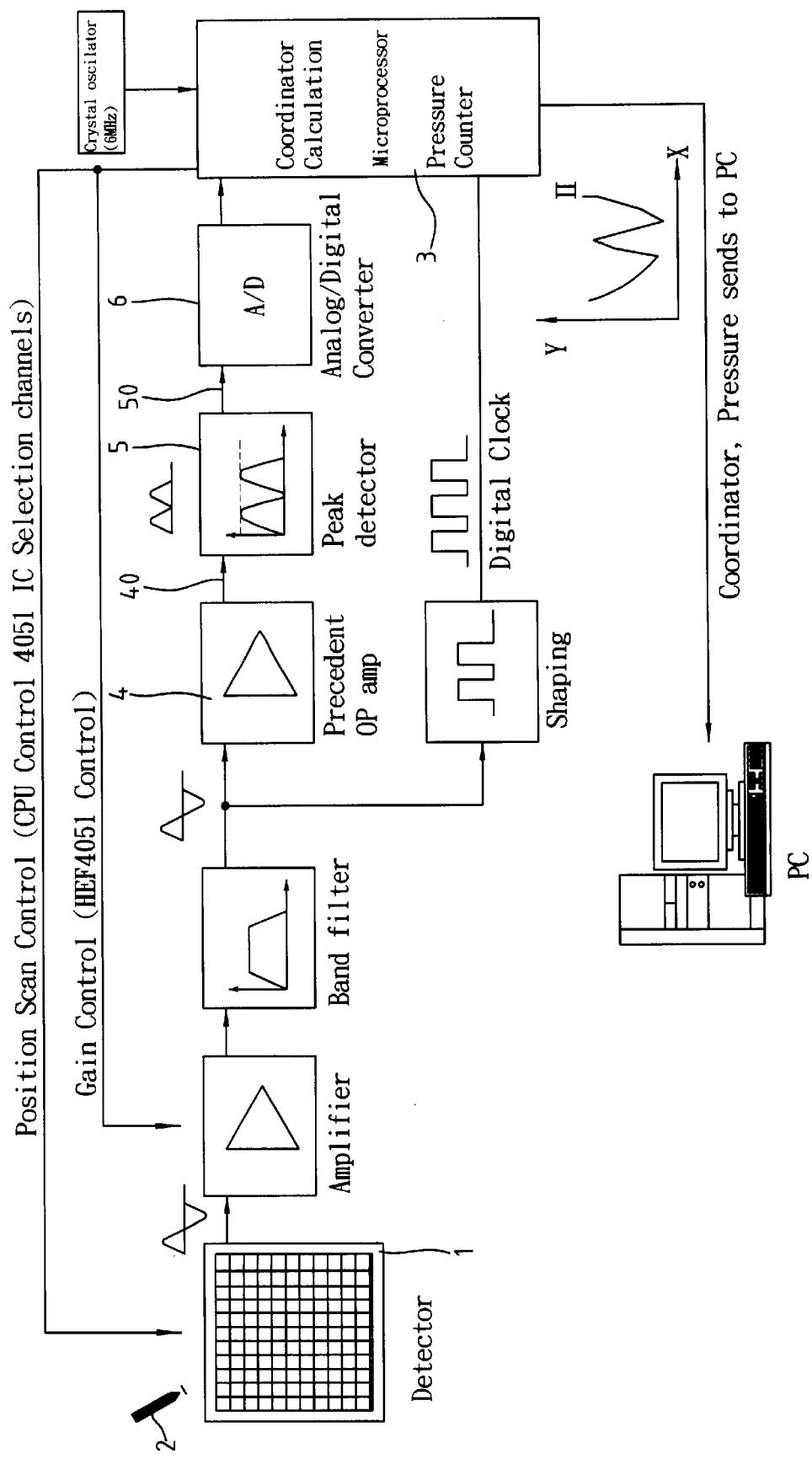
FIG. 1 is a circuit block diagram of a conventional wireless handwriting tablet.
Figure 2:
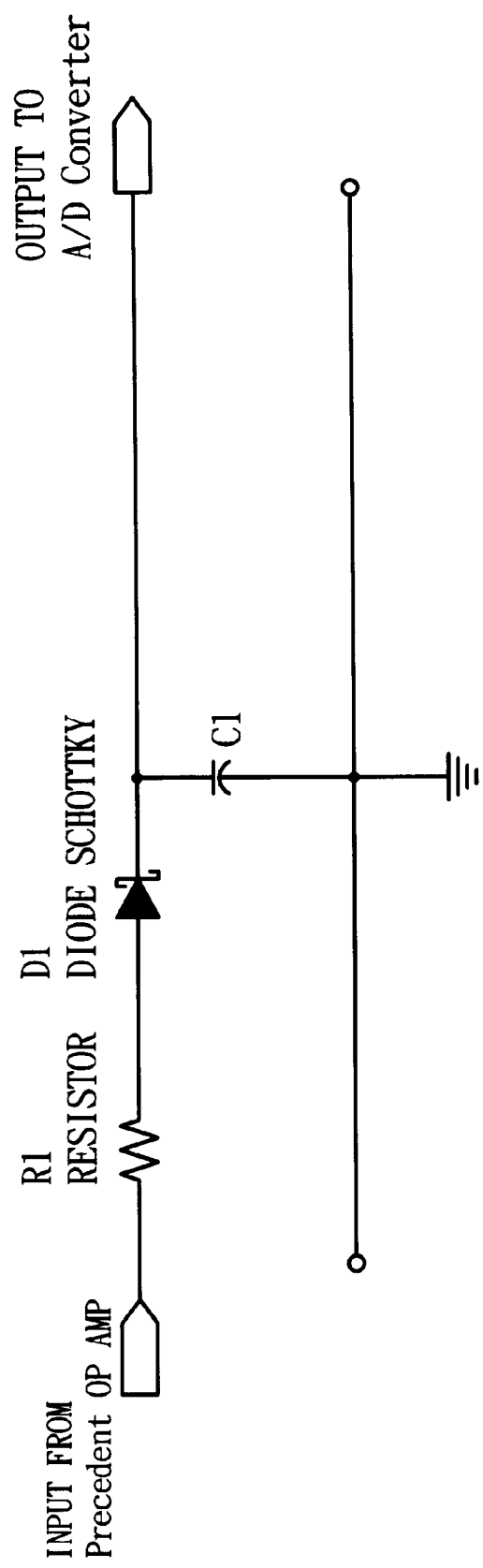
FIG. 2 is a circuit diagram of a conventional peak detector.
Figure 3:
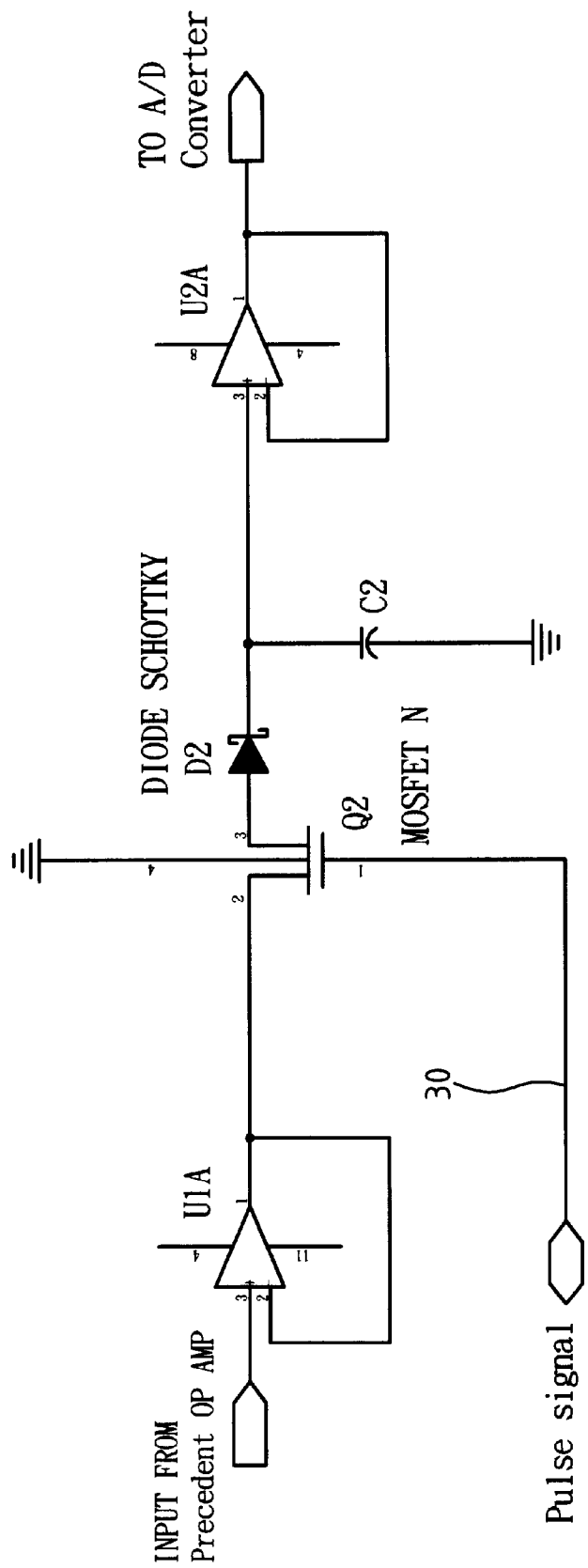
FIG. 3 is another circuit diagram of a conventional peak detector.
Figure 4:
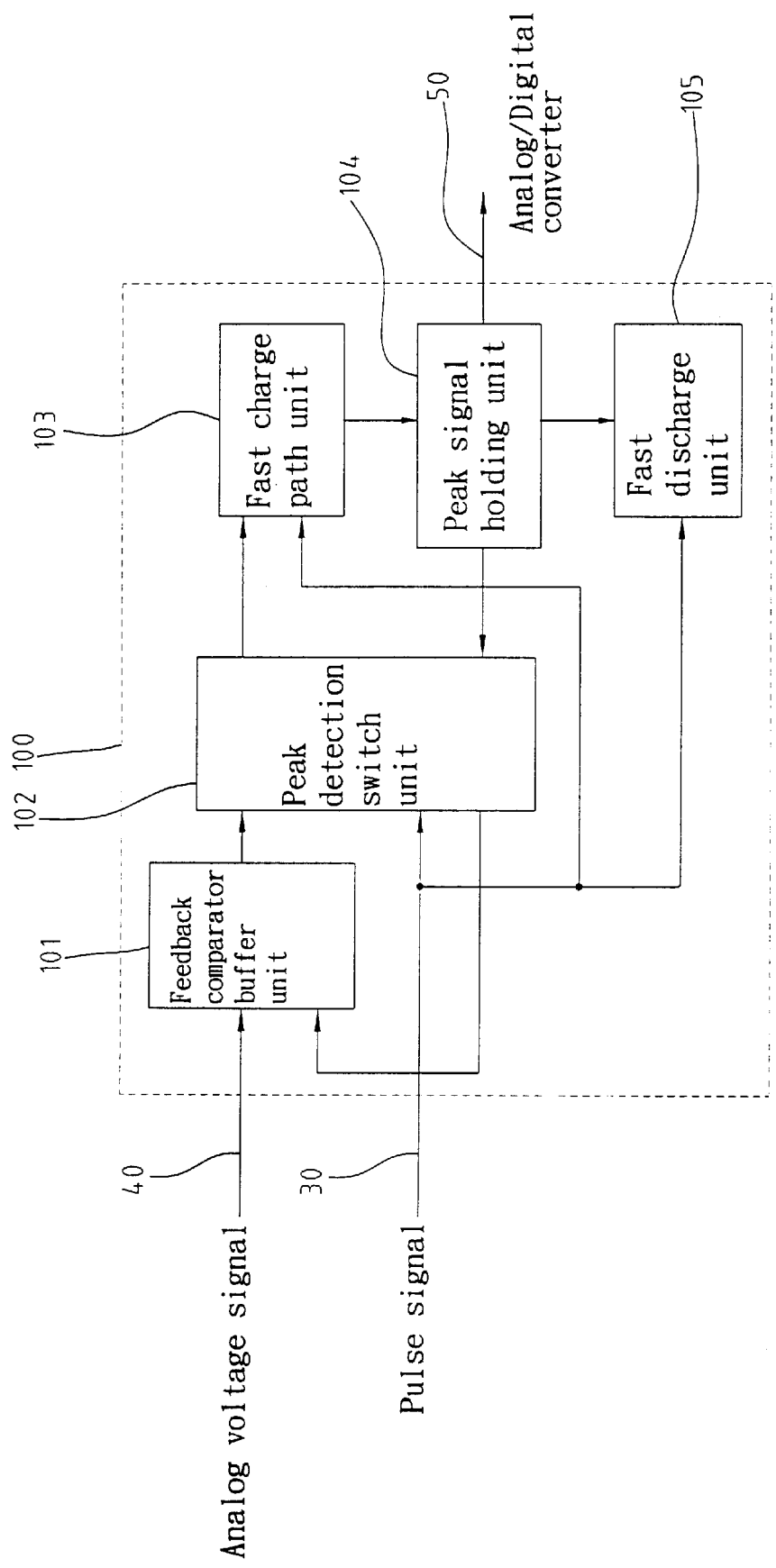
FIG. 4 is a circuit diagram of a peak detector of this invention.

As illustrated in FIG. 4, a peak detector 100 of this invention comprises a feedback comparator buffer unit 101, a peak detection switch unit 102, a fast charge path unit 103, a peak signal holding unit 104, and a fast discharge unit 105, wherein a plurality of output ends of the peak detection switch unit 102 is coupled to the feedback comparator buffer unit 101 and the fast charge path unit 103 respectively; the peak signal holding unit 104 is connected respectively to the peak detection switch unit 102, the fast discharge unit 105, and an analog/digital converter (ADC); a train of analog voltage signals 40 is applied to an input end of the feedback comparator buffer unit 101; an output end of the feedback comparator buffer unit 101 is coupled to the peak detection switch unit 102; an output end of the fast charge path unit 103 is connected to the peak signal holding unit 104; a control pulse signal 30 is applied to the peak detection switch unit 102, the fast charge path unit 103, and the fast discharge unit 105 respectively. After being treated in the peak detector 100 of this invention, the train of analog voltage signals 40 becomes pure peak signals 50 providing to the ADC.

Figure 5:
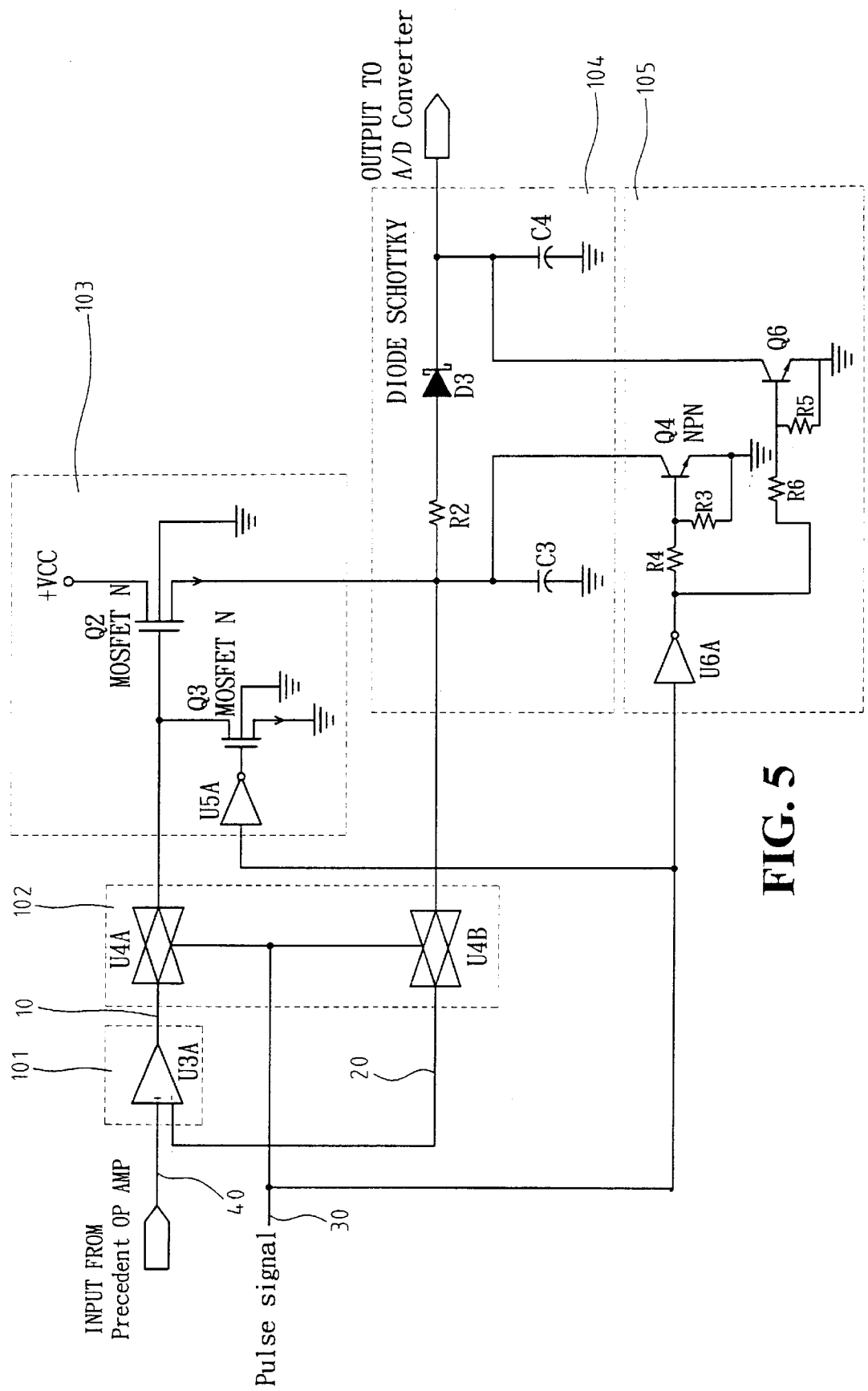
FIG. 5 shows a substantial embodiment of the peak detector of this invention.

In an embodiment of this invention shown in FIG. 5, the feedback comparator buffer unit 101 is an OP amp U3A for comparison of an analog voltage signal 40 and a feedback capacitor's voltage signal 20, in which a non-inversion input end is applied with the analog voltage signal 40 come from a precedent OP amp while the other end, an inversion input end, is arranged to receive the feedback capacitor's voltage signal 20. When the analog voltage signal 40 is greater than the feedback capacitor's voltage signal 20, a voltage comparison signal 10 of the OP amp U3A is positively saturated, or negatively saturated vice versa. Meanwhile, the feedback comparator buffer unit 101 serves as a segregation buffer between the precedent analog circuit and a rear digital circuit so that the analog voltage signal 40 won't be distorted due to a heavy load or interfered by noise of the rear digital circuit.

The peak detection switch unit 102 in FIG. 5 is composed of a first and a second transmission gate U4A, U4B, wherein the input end of the first transmission gate U4A is coupled to the output end of the feedback comparator buffer unit 101 and the output end of the second transmission gate U4B is connected with one end of a resistor R2; a control end of the first and the second transmission gate U4A, U4B are connected to a source of the control pulse signal 30. The peak detection switch unit 102 is offered to switch ON/OFF operation of the feedback capacitor's voltage signal 20 and the voltage comparison signal 10.

The fast charge path unit 103 comprises a first and a second MOSFET Q2, Q3, and an inverter U5A, wherein the Gate of the first MOSFET Q2 and the Drain of the second MOSFET Q3 are jointed together and coupled to the output end of the first transmission gate U4A; the input end of the inverter U5A is connected to the source of the control pulse signal 30 and the output end to the Gate of the second MOSFET Q3; the Drain of the first MOSFET Q2 is coupled with the positive end of a power supply+Vcc while its Source is coupled with one end of the resistor R2. By charging through a transistor-switching path with a relatively larger voltage offset and current, the fast charge path unit 103 can charge a capacitor far quicker than the conventional charging process by way of an OP amp, and meanwhile, the fast charge path unit 103 is also designed to stabilize the Gate of the first MOSFET Q2 to avoid the floating state.

The peak signal holding unit 104 is composed of a Schottky diode D3 connected in series with the other end of resistor R2, a potential-following capacitor C3 connected in parallel, and a peak-holding capacitor C4, wherein one end of the potential-following capacitor C3 is jointed with one end of the resistor R2; one end of the peak-holding capacitor C4 is coupled to the output end of the Schottky diode D3 and the input end of the ADC. The peak signal holding unit 104 functions to filter any possible noise to ensure a stable voltage of the peak-holding capacitor C4, which is then relayed to the ADC.

The fast discharge unit 105 is composed of a first resistor R3, a second resistor R4, a bipolar junction transistor Q4, and an inverter U6A, wherein the control pulse signal 30 is applied to the input end of the inverter U6A; one end of the second resistor R4 is coupled to the output end of the inverter U6A; one end of the first resistor R3 is connected to the other end of the second resistor R4 and the Base of the bipolar junction transistor Q4; the Collector of the bipolar junction transistor Q4 is coupled with one end of the potential-following capacitor C3; and the Emitter of the bipolar junction transistor Q4 is connected with the other end of the first resistor R3. The fast discharge unit 105 enables the potential-following capacitor C3 and the peak-holding capacitor C4 to discharge fast through a transistor-switching path.

The detailed operation process is described below basing on abovesaid architecture.

When the control pulse signal 30 provided by a microprocessor is positive, both the first and the second transmission gates U4A, U4B are turned on, and in the negative half cycle of the analog voltage signal 40, the voltage comparison signal 10 of the feedback comparator buffer unit 101 is negatively saturated. At this moment, because a negative output is given by the inverter U5A to keep the MOSFET Q3 "OFF" and the Gate of the MOSFET Q2 at a low level, namely, the MOSFET Q2 is kept "OFF" too, so that both the potential-following capacitor C3 and the peak-holding capacitor C4 are not yet charged and held in a low voltage level.

In the positive half cycle of the analog voltage signal 40, the voltage comparison signal 10 of the feedback comparator buffer unit 101 is turned positively. At this moment, the MOSFET Q2 is turned ON and the power supply+Vcc starts charging the potential-following capacitor C3 to have a voltage feedback applied to the inversion input end of the OP amp U3A via the second transmission gate U4B. When the potential of the potential-following capacitor C3 climbs to equal the peak of the analog voltage signal 40, the voltage comparison signal 10 is then turned to negatively saturated to thereby turn the MOSFET Q2 "OFF" and hinder the potential-following capacitor C3 from going up any more. However, if the analog voltage signal 40 increase its amplitude further, the voltage comparison signal 10 will become positively saturated to turn the MOSFET Q2 "ON" again and charge the potential-following capacitor C3 one more time accordingly.

As mentioned above, the potential of the capacitor C3 follows the analog voltage signal 40 to go higher and higher unit the highest amplitude of the latter is reached and held, whereas when the analog voltage signal 40 becomes smaller or negative, the potential of the capacitor C3 is held at constant instead of descending down. During the low level of the control pulse signal 30, both the first and the second transmission gates U4A, U4B are "OFF" while the MOSFET Q3 is turned "ON" and the MOSFET Q2 is "OFF" distinctly without floating, and at this time, the power supply+Vcc would stop charging the capacitor C3, C4. The inverter U6A provides now a positive bias to the bipolar junction transistor Q4, Q6 to turn them "ON" for discharge of both the potential-following capacitor C3 and the peak-holding capacitor C4.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A feedback peak detector fitted wireless handwriting tablet, wherein the feedback peak detector comprises:

a feedback comparator buffer unit, having one end for input of an analog voltage signal, another end for input of a voltage signal of a feedback capacitor, and one more end for output of a voltage comparison signal;

a fast charge path unit for charging fast a potential-following capacitor and stabilizing the Gate of a first MOSFET;

a peak detection switch unit, having: a plurality of output ends coupled with the feedback peak detector and the fast charge path unit respectively; an input end coupled to the output end of the feedback comparator buffer unit; a control end for input of a control pulse signal; for control ON/OFF operation of a feedback capacitor's voltage signal and the voltage comparison signal;

a fast discharge unit for discharging fast the potential-following capacitor and a peak-holding capacitor; and a peak signal holding unit for filtering possible noise to hold the peak-holding capacitor at a stable voltage, having: a plurality of connecting ends coupled to the peak detection switch unit, the fast discharge unit, and an analog/digital converter (ADC) respectively; an input end connected with the output end of the fast charge path unit, and an output end connected to the ADC.

2. The wireless handwriting tablet according to claim 1, wherein the feedback comparator buffer unit is an OP amp having: a non-inversion input end for input of an analog voltage signal; an inversion input end for input of a voltage signal of the feedback capacitor; and an output end for output of a voltage comparison signal.

3. The wireless handwriting tablet according to claim 1, wherein the fast charge path unit is composed of a first MOSFET, a second MOSFET, and an inverter, wherein the Gate of the first MOSFET and the Drain of the second MOSFET are connected together to the output end of a first transmission gate; the input end of the inverter is arranged for input of the control pulse signal; the Gate of the second MOSFET is coupled to the output end of the inverter; the Drain of the first MOSFET is connected with a positive end of a power supply; and the Source of the first MOSFET is connected to an input end of the peak signal holding unit.

4. The wireless handwriting tablet according to claim 1, wherein the peak detection switch unit is composed of a first transmission gate and a second transmission gate, wherein the input end of the first transmission gate is coupled to the output end of the feedback comparator buffer unit; the output end of the first transmission gate is connected to one end of the fast charge path unit; the output end of the second transmission gate is coupled to one end of the peak signal holding unit; the input end of the second transmission gate is coupled to an inversion input end of the feedback comparator buffer unit; and the control end of both the first and the second transmission gates are jointed together for input of the control pulse signal.

5. The wireless handwriting tablet according to claim 1, wherein the fast discharge unit is composed of a first resistor, a second resistor, a bipolar junction transistor, and another inverter, wherein the other inverter is arranged for input of the control pulse signal; one end of the second resistor is connected to the output end of the other converter; one end of the first resistor is connected to the other end of the second resistor and the Base of the bipolar junction transistor; and the collector and the emitter of the bipolar transistor are connected to one end of the potential-following capacitor and the other end of the first resistor respectively.

6. The wireless handwriting tablet according to claim 1, wherein the peak signal holding unit is composed of a resistor coupled with a Schottky diode in series and with the potential-following capacitor in parallel as well as the peak-holding capacitor, wherein one end of the potential-following capacitor is jointed with one end of the resistor and one end of the peak-holding capacitor is coupled to the output end of the Schottky diode and the ADC.

7. The wireless handwriting tablet according to claim 3, wherein the first MOSFET or the second MOSFET is replaceable with a bipolar junction transistor or a transmission gate.

8. The wireless handwriting tablet according to claim 4, wherein the first transmission gate or the second transmission gate is replaceable with a CMOS transmission gate, a MOSFET, a bipolar junction transistor, or any transistor servable for a switch.

9. The wireless handwriting tablet according to claim 5, wherein the bipolar junction transistor is replaceable with a MOSFET or a transmission gate.

* * * * *